(12) United States Patent
Cordero

(10) Patent No.: US 6,752,038 B2
(45) Date of Patent: Jun. 22, 2004

(54) SYSTEM FOR RELEASING A PEDAL OF A MOTOR VEHICLE IN THE EVENT OF A FRONTAL IMPACT

(75) Inventor: Renato Cordero, Sommariva Del Bosco (IT)

(73) Assignee: Fiat Auto S.p.A., Turin (IT)

( * ) Notice: Subject to any disclaimer, the term of this patent is extended or adjusted under 35 U.S.C. 154(b) by 30 days.

(21) Appl. No.: 10/152,811

(22) Filed: May 23, 2002

(65) Prior Publication Data

US 2002/0174739 A1 Nov. 28, 2002

(30) Foreign Application Priority Data

May 23, 2001 (IT) ..................................... TO2001A0482

(51) Int. Cl.[7] .............................. G05G 1/14; B60T 7/22
(52) U.S. Cl. ........................... 74/512; 74/560; 180/274
(58) Field of Search .......................... 74/512, 560, 513; 180/274, 271, 275

(56) References Cited

U.S. PATENT DOCUMENTS

| | | | | |
|---|---|---|---|---|
| 5,385,068 A | * | 1/1995 | White et al. | 74/512 |
| 5,921,144 A | * | 7/1999 | Williams, Jr. et al. | 74/512 |
| 6,089,119 A | * | 7/2000 | Leboisne et al. | 74/512 |
| 6,279,417 B1 | * | 8/2001 | Mizuma et al. | 74/512 |
| 6,336,376 B1 | * | 1/2002 | Lee | 74/512 |
| 6,339,971 B1 | * | 1/2002 | Kato | 74/512 |
| 6,539,823 B1 | * | 4/2003 | Tomono et al. | 74/512 |
| 2001/0006010 A1 | | 7/2001 | Choi | |
| 2003/0047022 A1 | * | 3/2003 | Gohbrandt et al. | 74/512 |

FOREIGN PATENT DOCUMENTS

| | | | | |
|---|---|---|---|---|
| DE | 019851017 A1 | * | 5/2000 | 74/512 |
| EP | 0 827 885 A1 | | 3/1998 | |
| EP | 0 982 645 A2 | | 3/2000 | |
| EP | 001247710 A1 | * | 10/2002 | 74/512 |
| GB | 2 330 647 A | * | 4/1999 | 74/512 |
| GB | 2 332 264 A | | 6/1999 | |

* cited by examiner

Primary Examiner—Vinh T. Luong
(74) Attorney, Agent, or Firm—Sughrue Mion, PLLC

(57) ABSTRACT

In a system for releasing a pedal of a motor vehicle in the event of a frontal impact, the pedal includes a first, inner element which is transversely pivoted on a support secured to a front portion of the body of the vehicle and is able to operate a control rod, and a second, outer element having a lower, lever portion, operable by the driver, and an upper portion transversely pivoted on the inner element. A pair of tongues are provided for securing the said first and second elements together, and a stop member is mounted on a portion of the passenger compartment behind the pedal. The system can assume a first, normal operating condition, in which the elements are secured to each other by the tongues, and in a second condition, in the event of a frontal impact, in which rearward movement of the pedal towards the stop member causes the tongues to yield, thus allowing the outer element of the pedal to rotate relative to the inner element.

9 Claims, 3 Drawing Sheets

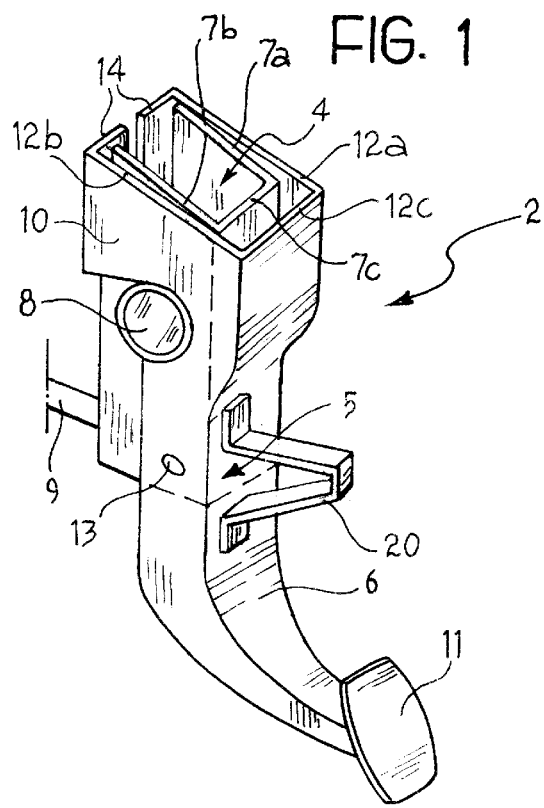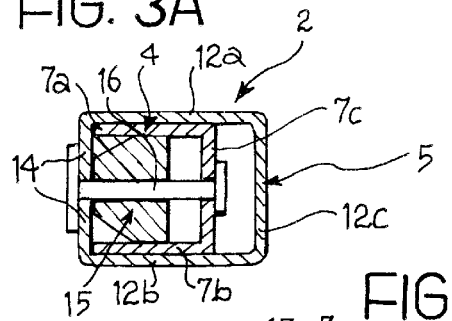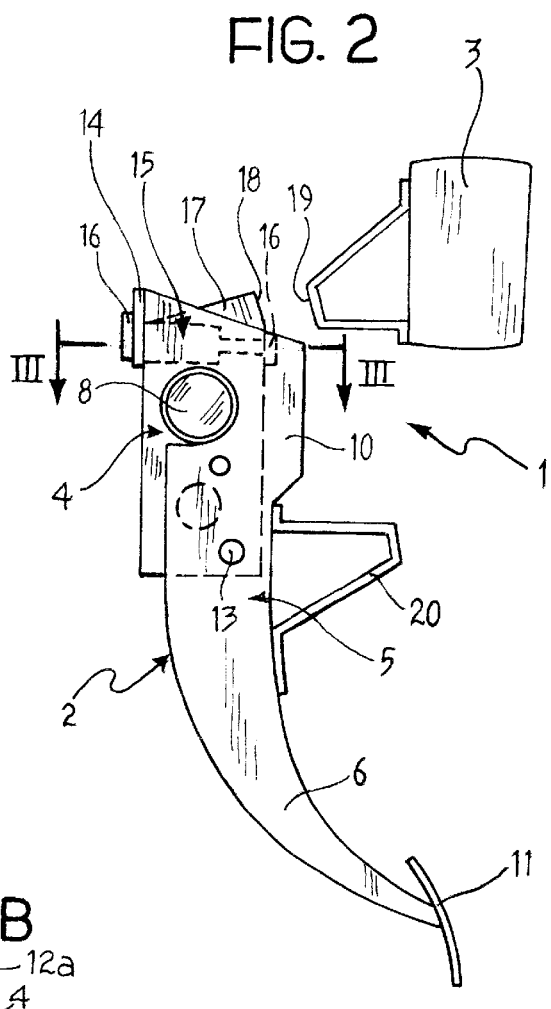

SYSTEM FOR RELEASING A PEDAL OF A MOTOR VEHICLE IN THE EVENT OF A FRONTAL IMPACT

BACKGROUND OF THE INVENTION

The present invention relates to a system for releasing a pedal of a motor vehicle in the event of a frontal impact.

In order better to understand the art in this field, and the problems associated with it, a known embodiment of a system for the release of a pedal of a motor vehicle will be described first, with reference to FIG. 5 of the appended drawings, which forms part of European Patent Application EP 0 827 885.

This application proposes a system which, in the event of an impact of the motor vehicle, is able to disengage a brake pedal lever 10 from a support body 16, secured to the vehicle body, in order to minimize the risk of injury to the driver's legs. The pedal 10 is hinged by a pin 11 to a bracket 20, a lower portion of which is pivoted in turn on the body 16 by means of a hinge 15, and an upper portion of which is secured to a hook device 30 by means of a pin 21. The hook device 30 is pivoted at a first point 32 on a steering column 40 and rigidly connected at a second point 33 to the support body 16. Under normal operating conditions of the vehicle, the hook device 30 is held in a first working position in which it holds the bracket 20 stationary. In the event, however, of a frontal impact of the vehicle, movement of the support body 16 towards the passenger compartment, and thus towards the steering column 40, causes the hook device 30 to rotate anticlockwise about the point 32 at which it is pivoted on the said steering column, resulting in disengagement of the pin 21 integral with the bracket 20. No longer fixed to the hook device 30, the bracket 20 is free to rotate clockwise about the point 15 at which it is pivoted on the support body 16. This means that the pedal 10 also is free to rotate clockwise, about a point 13 at which it is connected to the control rod of the servo-assisted brake, by the effect of the reactive force exerted by the driver's foot, until it reaches a wall 17 separating the engine compartment from the passenger compartment.

The main disadvantage of an arrangement of this type consists in the space it takes up and in the risk of jamming during emergency operation in the event of a collision. In order to overcome this second drawback, the patent discussed above explicitly mentions the need to arrange the points at which the various elements of the system are connected very carefully, so that the point 13 at which a reactive force is applied to the pedal 10, when this is pressed, substantially coincides with the point 15 at which the bracket 20 is pivoted on the support body 16, in order to ensure that the pedal 10 and the bracket 20 rotate about the same point.

SUMMARY OF THE INVENTION

The object of the present invention is to provide an improved system for releasing a pedal of a motor vehicle which is of a reduced size, of simple structure and of reliable and quick operation.

As will become apparent from the description which follows, this object is achieved according to the invention by providing a system for releasing a pedal of a motor vehicle in the event of a frontal impact, characterised by the appended Claims and in particular by the fact that it includes a pedal, comprising a first, inner element, transversely pivoted at a first point on a support secured to the front portion of the vehicle body and able to operate a rod for controlling the device associated with the pedal;

a second, outer element which has a lower lever portion for operation by the driver, and an upper portion, transversely pivoted at a second point on the inner element, and releasable coupling means for coupling the two inner and outer elements of the pedal; and a stop member mounted in a portion of the passenger compartment behind the pedal;

the system being capable of assuming two operating conditions:

a first, normal operating condition, in which the inner and outer elements of the pedal are coupled by the releasable coupling means; and a second operating condition, in the event of a frontal impact of the vehicle, in which movement backwards of the pedal towards the stop member is capable of causing the aforesaid coupling means to be released, thereby allowing the outer element of the pedal to rotate about the second pivoting point.

The main advantage of the system of the invention consists essentially in a reduction of the space occupied and in a simple structure, since the system forms part of the pedal and does not therefore require additional external support elements.

Another important advantage consists in the fact that a releasable pedal according to the invention can be mounted as it is on conventional pedal supports, since it requires only a support for the first pivoting pin.

BRIEF DESCRIPTION OF THE DRAWINGS

The invention will now be described in greater detail, purely by way of non-limitative example and with reference to the appended drawings, in which:

FIG. 1 is a perspective view schematically illustrating a system for releasing a pedal of a motor vehicle in the event of a frontal impact, according to the invention;

FIG. 2 is a side view of the system of FIG. 1;

FIG. 3A is a plan view, sectioned along the line III—III of FIG. 2, of the system of FIGS. 1 and 2;

FIGS. 3B and 3C are similar views to that of FIG. 3A, corresponding respectively to two different times in the operating dynamics of the system of the invention in the event of a frontal impact of the vehicle;

DETAILED DESCRIPTION OF THE INVENTION

Figure 4:
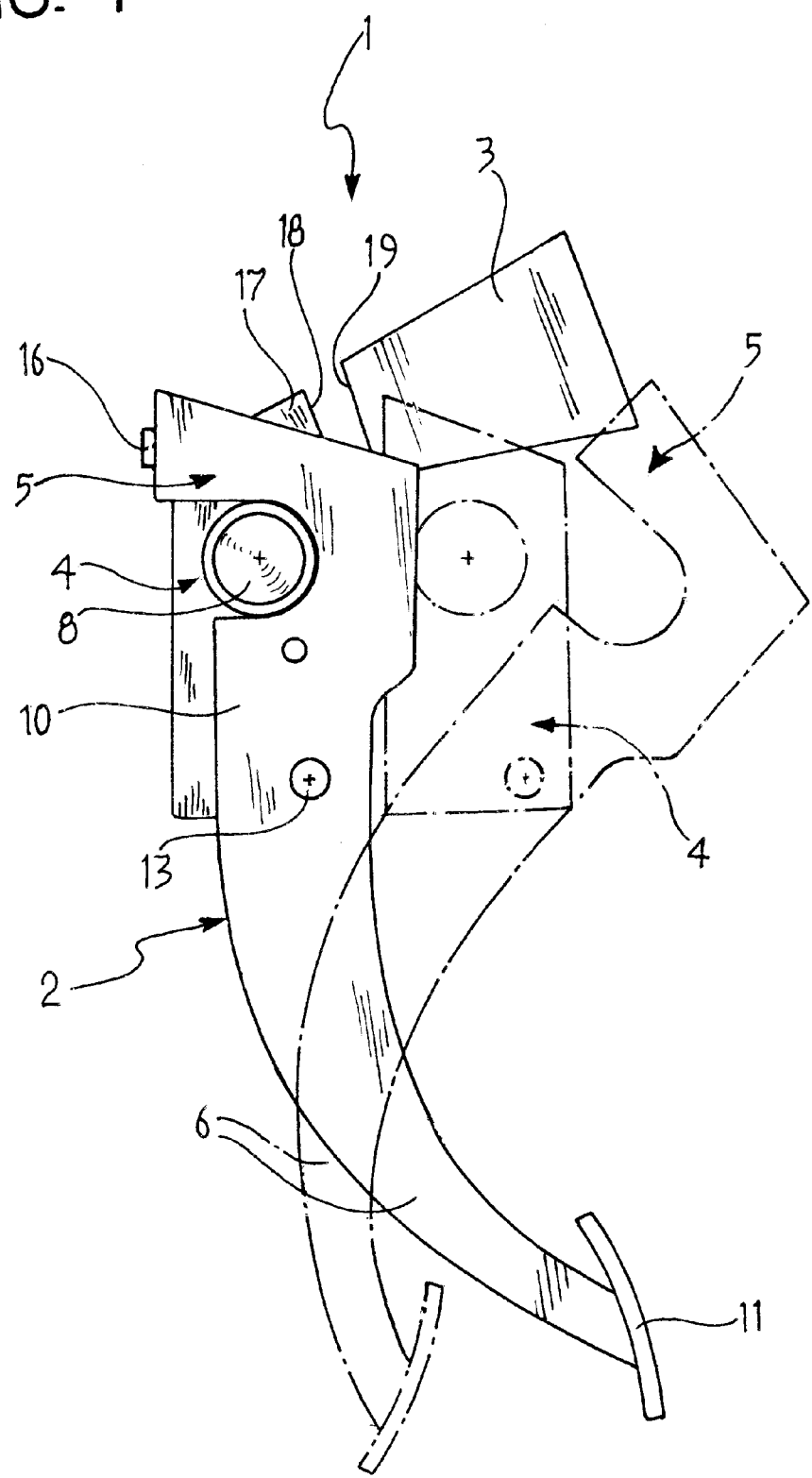
FIG. 4 is a schematic side view of the system of the invention, with a possible end position of the pedal in the event of a frontal impact of the vehicle shown in a broken line.
Figure 5:
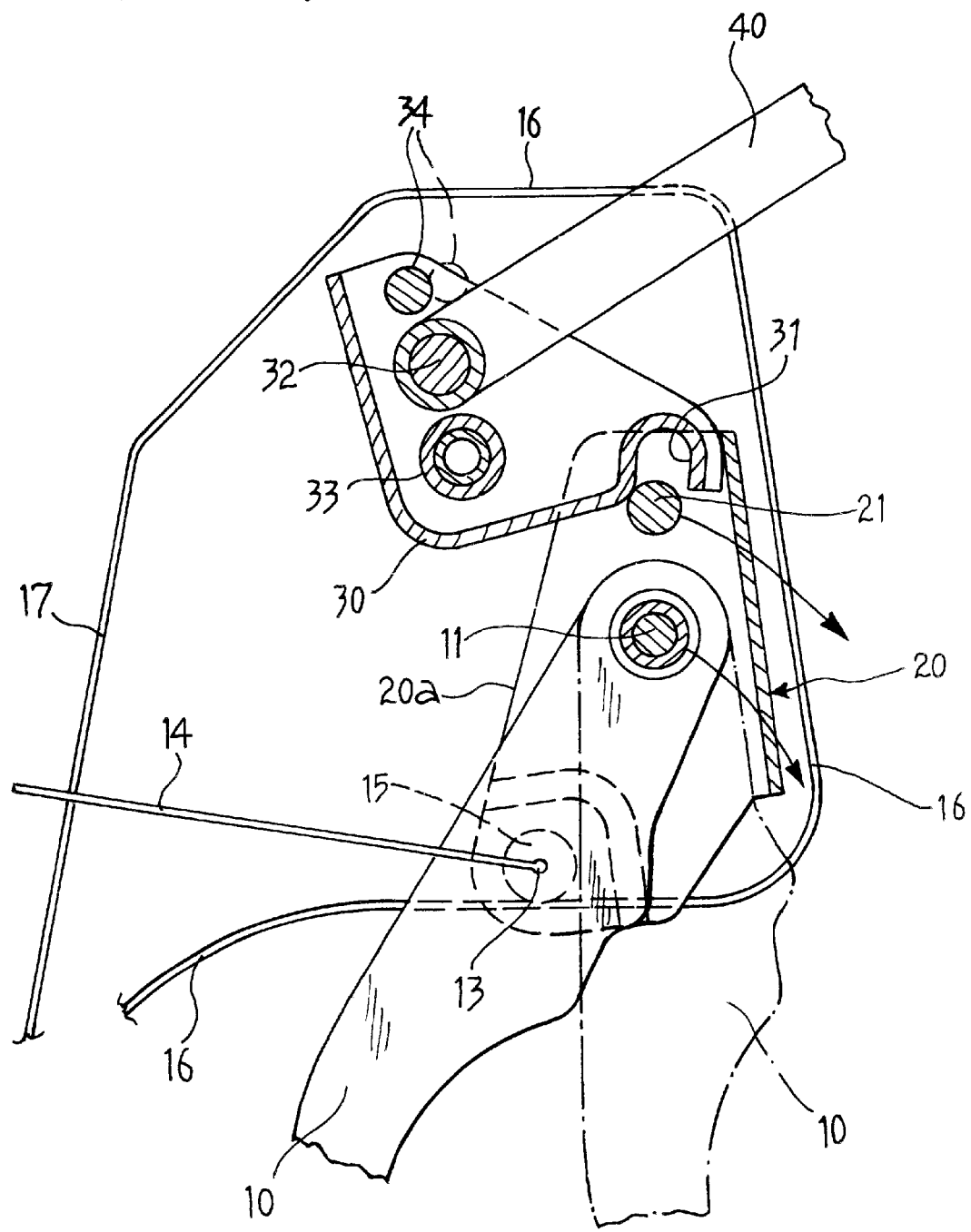
FIG. 5 is a side view of a system for releasing the brake pedal of a motor vehicle in the event of a frontal impact according to the arrangement described in European Patent Application EP 0 827 885.

In the description and the claims which follow, terms such as "front" or "rear", "longitudinal" or "transverse" should be understood with reference to the orientation of the system when mounted in a motor vehicle.

With reference to FIGS. 1 and 2, a system for releasing a pedal in a motor vehicle in the event of a frontal impact according to the present invention is generally indicated 1.

Basically, this system includes
- a pedal 2, which in the example described here is a brake pedal, but could equally be the clutch and/or the accelerator pedal of the motor vehicle, and
- a stop member 3, mounted on a portion of the passenger compartment, such as the steering column SC, expected to remain substantially stationary with respect to the pedals of the vehicle in the event of a frontal impact.

The pedal 2 comprises in turn
- an inner element 4, mounted on a fireproof panel FP which separates the engine compartment from the passenger compartment in which the pedal is located, and an outer element 5, with a lever 6 for the driver of the vehicle to operate the pedal 2.

The inner element 4 of the pedal 2 is a tubular piece of sheet metal, vertically disposed and C-shaped in cross section, two opposite side walls 7a, 7b of which are joined by a rear transverse wall 7c. This element is pivoted by a hinge pin 8 to the pedal support and is connected to the end of a rod 9 for controlling the braking system (not shown).

The outer element 5 of the pedal 2 forms an upper portion 10 which engages the inner element 4 and a lower portion constituting the aforesaid operating lever 6, the free end of which has a plate 11 which the driver acts on to control the brakes. The upper portion 10 of the outer element 5 is a piece of sheet metal, vertically arranged and with an open, substantially C-shaped cross section, two opposite side walls 12a, 12b of which are joined by a transverse rear wall 12c, and the dimensions of which are such that it can accommodate the pedal element 4 inside it.

The outer element 5 is coupled with the inner element 4 by means of
- a transverse pin 13 which passes through, in this order, the side walls 7a, 12a, 12b and 7b of the two elements 4 and 5 of the pedal 2, beneath the axis along which it is connected to the brake system (control rod 9), and is formed in such a way that the two elements are able to rotate relative to each other if necessary (as will be explained better later); and
- two front transverse tongues 14, formed integrally with the side walls 12, 12b of the outer element 5 and folded at a right angle thereto, thereby enclosing the inner element 4 at the front, above the pivot pin 8.

The side walls 12a, 12b of the outer element 5 of the pedal 2 are also shaped around the pivot pin 8 in order to enable this pin to be mounted on the pedal support.

Under normal operating conditions, the inner 4 and outer 5 elements of the pedal 2 operate as one rigid body able to pivot in a longitudinal vertical plane about the pivot pin 8. Therefore, when the driver of the vehicle presses the lever 6 of the pedal 2, causing the outer element 5 to rotate clockwise, the inner element 4 also rotates clockwise about the pivot 8, thus causing the control rod 9 of the brake system to move forwards.

In order to allow the outer element 5 of the pedal 2 to disengage from the inner element 4 in the event of a frontal impact of the motor vehicle, the pedal of the invention is provided with an insert 15 (see FIGS. 2 and 3A) fitted in the upper portion of the inner element. This insert is coupled by a retaining device 16 both with the transverse rear wall 7c of the inner element 4 and with the front transverse tongues 14 of the outer element 5. In particular, the inner element 4 is connected to the wall 7c of the inner element 4 by riveting so as to provide a secure connection during normal operation of the pedal but to enable the stop member 16 to disengage from this element (as shown in FIG. 3B) in the event of a frontal impact strong enough to cause severe deformation of the front of the vehicle.

A rear end portion 17 of the insert 15 (not shown in FIG. 1) projects from the top of the pedal 2 and has a surface 18 which would interact with a corresponding front surface 19 on the stop member 3 in the event of the pedal being forced back as a result of a frontal impact of the vehicle.

With reference now to FIGS. 3B, 3C and 4, operation of the pedal release system of the invention in the event of an accident will be described.

As a result of an impact strong enough to cause significant deformation by longitudinal crumpling of the vehicle, the front of the car is forced back relative to the passenger compartment, causing the pedal 2, pivoted by means of the pin 8 on a support secured to the front portion of the vehicle, to move closer to the stop member 3 fixed, on the other hand, to a portion of the passenger compartment, such as the steering column or a transverse member beneath the floor, which remains substantially stationary during the impact (relative to the front of the vehicle).

The pedal release system operates when the pedal 2 moves back relative to the stop member 3 by enough to cancel out the distance (advantageously of around 30 mm) between the cooperating surfaces 18 and 19 of the insert 15 and of the member 3 respectively. Once this distance has been cancelled out, any additional movement of the pedal 2 towards the stop member 3 will make the latter, in cooperation with the insert 15, push forwards and deform the transverse front tongues 14 of the outer element 5 until they are in a final "open" configuration which releases the inner element 4. At this point, the outer element of the pedal is free to rotate relative to the inner element about the pin 13, until it reaches, for example, the end position shown by a broken line in FIG. 4, thus offering no resistance in the event of contact with the driver's foot and therefore causing no serious injury to it.

According to a further aspect of the invention, a bracket 20 (not shown in FIG. 4) is mounted on the outer element 5 of the pedal 2, on the rear surface of the lever 6, and extends inwardly of the passenger compartment in order to cause and/or facilitate, in the event of an impact, the overturning of this element as a result of the reactive force against a fixed point (relative to the pedal) of the passenger compartment, such as the steering column, for example.

Naturally, the principle of the invention remaining the same, embodiments and manufacturing details may vary widely from those described and illustrated purely by way of non-limitative example, without departing thereby from the scope of the invention, as defined in the appended claims.

What is claimed is:

1. A system for releasing a pedal of a motor vehicle in the event of a frontal impact, the system including:
    a pedal comprising
        a first, inner element which is pivoted to a support structure mounted on a front portion of a body of the motor vehicle about a first axis and is connected to a control rod for operation of a device to be controlled by the pedal;
        a second, outer element which forms a lower lever portion for operation by the driver and an upper portion articulated to the inner element about a second axis positioned beneath the first axis; and
        coupling means for releasably connecting the said first and second elements to each other; and
    a stop member mounted on a portion of a passenger compartment of the motor vehicle in a position located behind the pedal and at a distance therefrom;

the system being arranged to assume two operating conditions:
- a first, normal operating condition, in which the first and second elements of the pedal are coupled to each other by the coupling means so as to swivel as a single piece about the said first axis; and
- a second operating condition, resulting from a frontal impact of the motor vehicle, in which rearward displacement of the pedal larger than the distance between the pedal and the stop member causes the coupling means to be released by the stop member and the second element to be allowed to swivel about the second axis with respect to the first element.

2. The system of claim 1, wherein the first element of the pedal is enclosed, at least partially, by the upper portion of the second element and the coupling means include at least one metal tongue formed by the upper portion of the second element and bent over at least part of the inner element of the pedal.

3. The system of claim 2, wherein both the first element and the upper portion of the second element of the pedal have two opposite side walls and a transverse rear wall connecting the side walls, and the coupling means include a pair of tongues formed integrally with the side walls of the upper portion of the second element and folded at a right angle thereto so as to enclose the first element at the front.

4. The system of claim 3, wherein the aforesaid tongues are essentially symmetrical relative to a vertical, longitudinal plane of symmetry of the pedal.

5. The system of claim 1, wherein the point at which the first and second elements of the pedal are articulated to each other is arranged below the point at which the first element is connected to the control rod, and the coupling means are arranged above the point at which the first element is pivoted on the pedal support.

6. The system of claim 3, wherein the pedal further includes an insert with a rear end portion projecting from the top of the pedal and arranged to be urged by the stop member against the said coupling means, in the aforesaid second operating condition, so as to cause the coupling means to be released.

7. The system of claim 6, wherein the insert is secured to both the first and second elements of the pedal so as to rigidly connect these elements to each other in the aforesaid first, normal operating condition.

8. The system of claim 7, wherein the insert is secured at its front to the tongues of the second element of the pedal and at its rear to the transverse wall of the first element.

9. The system of claim 8, wherein the insert is secured to the transverse wall of the first element of the pedal by riveting.

* * * * *